(12) United States Patent
Kawai

(10) Patent No.: US 8,180,508 B2
(45) Date of Patent: May 15, 2012

(54) ELECTRICITY STORAGE CONTROL APPARATUS AND METHOD OF CONTROLLING ELECTRICITY STORAGE

(75) Inventor: Toshiyuki Kawai, Toyohashi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 401 days.

(21) Appl. No.: 12/374,720

(22) PCT Filed: Sep. 3, 2007

(86) PCT No.: PCT/IB2007/002526
§ 371 (c)(1),
(2), (4) Date: Jan. 22, 2009

(87) PCT Pub. No.: WO2008/029244
PCT Pub. Date: Mar. 13, 2008

(65) Prior Publication Data
US 2009/0319108 A1 Dec. 24, 2009

(30) Foreign Application Priority Data
Sep. 4, 2006 (JP) .................................. 2006-238557

(51) Int. Cl.
*G06F 19/00* (2006.01)
(52) U.S. Cl. ....... 701/22; 180/65.29; 320/104; 320/132; 320/149
(58) Field of Classification Search .......... 324/426–427, 324/430; 701/22; 320/132, 149, 104
See application file for complete search history.

(56) References Cited

U.S. PATENT DOCUMENTS

| 5,280,231 | A | 1/1994 | Kato et al. |
|---|---|---|---|
| 6,949,897 | B2 * | 9/2005 | Wakashiro et al. ........... 318/139 |
| 7,117,964 | B1 * | 10/2006 | Kuang et al. ................ 180/65.22 |
| 7,463,958 | B2 * | 12/2008 | Suzuki ............................ 701/22 |
| 7,617,893 | B2 * | 11/2009 | Syed et al. ................. 180/65.21 |
| 7,629,770 | B2 * | 12/2009 | Iida et al. ....................... 320/134 |
| 7,777,446 | B2 * | 8/2010 | Ueda et al. ..................... 320/104 |
| 2002/0113595 | A1 * | 8/2002 | Sakai et al. ..................... 324/433 |
| 2004/0164709 | A1 | 8/2004 | Kapsokavathis et al. |
| 2008/0284378 | A1 * | 11/2008 | Birke et al. .................... 320/149 |
| 2010/0000809 | A1 * | 1/2010 | Nishi et al. ................. 180/65.29 |

FOREIGN PATENT DOCUMENTS

| JP | 2003-047108 A | 2/2003 |
|---|---|---|
| JP | 2003-297435 A | 10/2003 |

OTHER PUBLICATIONS

Zhu et al., State of Charge Determination in a Lead-Acid Battery: Combined EMF Estimation and Ah-balance Approach, 2004, IEEE Power Electronics Specialists Conference, pp. 1908-1914.*

* cited by examiner

*Primary Examiner* — Thomas Black
*Assistant Examiner* — Sara Lewandroski
(74) *Attorney, Agent, or Firm* — Kenyon & Kenyon LLP

(57) ABSTRACT

An electricity storage control apparatus that controls an electricity storage device mounted on a vehicle includes control device that changes a target state of charge, which is used as the target of a state of charge of the electricity storage device, and calculating device that calculates an amount of decrease in voltage across the electricity storage device caused as the vehicle is operated. The control device increases the target state of charge if a decreased voltage value, which is lower than a reference voltage value of the electricity storage device by the voltage decrease amount calculated by the calculating device, is equal to or lower than a threshold.

8 Claims, 6 Drawing Sheets

ELECTRICITY STORAGE CONTROL APPARATUS AND METHOD OF CONTROLLING ELECTRICITY STORAGE

This is a 371 national phase application of PCT/IB2007/002526 filed 3 Sep. 2007, claiming priority to Japanese Patent Application No. 2006-238557 filed 4 Sep. 2006, the contents of which are incorporated herein by reference.

BACKGROUND OF THE INVENTION

1. Field of the Invention

The invention relates to an electricity storage control apparatus that controls an electricity storage device mounted on a vehicle, and to a method of controlling electricity storage.

2. Description of the Related Art

An electricity storage device (battery) is used as a drive power source of a vehicle. For example, in a hybrid vehicle, the electricity storage device discharges stored electricity to drive a motor, and thus causes wheels to rotate when the driver starts driving or during full throttle acceleration.

It is known that the internal resistance of the battery increases as the battery is repeatedly charged and discharged, and therefore the battery power output gradually decreases.

In consideration of the foregoing, in the related art, a target state of charge of the battery is fixed at a relatively high value (60%) so that a battery power output larger than a reference battery power output corresponding to a maximum vehicle power output is obtained, as shown in FIG. 5A illustrating a relation between the vehicle use time and the battery power output, and in this way, the battery is designed so that the battery power output does not fall below the reference battery power output before the vehicle lifetime expires.

On the other hand, as a method of extending the lifetime of the electricity storage device, a focus is placed on the principle that the wider the variation range of state of charge is, the shorter the lifetime of the electricity storage device is. Based on this, in the related art, it has been proposed that a maximum state of charge be decreased and a minimum state of charge be increased (see paragraph 0046, for example, of Japanese Patent Application Publication No. 2003-297435 (JP-A-2003-297435)).

In Japanese Patent Application Publication No. 2003-47108 (JP-A-2003-47108), a method has been proposed that, when the occurrence of a memory effect is detected based on the voltage, current, temperature, etc. of the battery, the target state of charge be changed from 50%, which is a setting used under normal conditions, to a value near the maximum state of charge within an appropriate state-of-charge range (see paragraph 0035, for example). In JP-A-2003-47108, it is said that, in this way, the memory effect can be eliminated without overcharging or overdischarging the battery, which makes it possible to prevent degradation of the battery.

However, as shown in FIG. 6 illustrating a relation between the rate at which the battery degrades and the target state of charge, there is a problem that, when the target state of charge is increased, the rate at which the battery degrades gets faster because the output voltage is increased. Accordingly, as shown in FIG. 5B, if the target state of charge is fixed at 60%, the battery lifetime becomes shorter, and it contradicts the demand for a smaller-sized battery.

In a method described in Japanese Patent Application Publication No. 2003-297435 (JP-A-2003-297435), only the upper limit or lower limit of the variable range in which the target state of charge is changed is changed, and the target state of charge itself remains the same. Accordingly, the aforementioned problem cannot be solved.

A method described in Japanese Patent Application Publication No. 2003-47108 (JP-A-2003-47108) merely increases the target state of charge to reset the memory effect when the occurrence of a memory effect is detected. Therefore, the problem of the accelerated degradation rate of the battery, which arises when the target state of charge is fixed at a high value, cannot be solved.

SUMMARY OF THE INVENTION

In consideration of the foregoing, the invention provides an electricity storage control apparatus with which it is possible to achieve a longer lifetime of an electricity storage device as compared to that of the electricity storage device of the related art, in which the target state of charge is fixed.

A first aspect of the invention is an electricity storage control apparatus that controls an electricity storage device mounted on a vehicle, and that includes: a control means for changing a target state of charge, which is used as the target of a state of charge of the electricity storage device; and a calculating means for calculating an amount of decrease in voltage across the electricity storage device caused as the vehicle is operated. In the electricity storage control apparatus, the control means increases the target state of charge if a decreased voltage value, which is lower than a reference voltage value of the electricity storage device by the voltage decrease amount calculated by the calculating means, is equal to or lower than a threshold.

Another aspect of the electricity storage control apparatus of the invention is an electricity storage control apparatus that controls an electricity storage device mounted on a vehicle, and that includes a control means for changing a target state of charge, which is used as the target of a state of charge of the electricity storage device. In the electricity storage control apparatus, the control means calculates an amount of decrease in voltage across the electricity storage device caused as the vehicle is operated, and increases the target state of charge if a decreased voltage value, which is lower than a reference voltage value of the electricity storage device by the voltage decrease amount, is equal to or lower than a threshold.

If the decreased voltage value is larger than the threshold, the control means may decrease the target state of charge.

Further, a reference power output from the electricity storage device generated at the reference voltage value may correspond to a maximum vehicle power output. In addition, a power output from the electricity storage device, which is used when calculating the voltage decrease amount of the electricity storage device caused as the vehicle is operated, may be set in a range from 70% to 80% of the reference power output.

The electricity storage control apparatus may further include: a current detecting means for detecting a value of electric current flowing through the electricity storage device; and a voltage detecting means for detecting a value of voltage across the electricity storage device. The reference voltage value may be estimated as follows. That is, when the electricity storage device is discharging, a current-voltage characteristic is calculated based on the current value detected by the current detecting means and the voltage value detected by the voltage detecting means, and then the reference voltage value is estimated based on the calculated current-voltage characteristic.

The control means may change the target state of charge within a range of 40% to 80%.

A second aspect of the invention is the method of controlling the electricity storage device that changes a target state of charge, which is used as the target of the electricity storage device mounted on a vehicle. The method includes: calculating an amount of decrease in voltage across the electricity storage device caused as the vehicle is operated; determining whether a decreased voltage value, which is lower than a reference voltage value of the electricity storage device by the voltage decrease amount calculated, is equal to or lower than a threshold; and increasing the target state of charge if it is determined that the decreased voltage value is equal to or lower than the threshold.

According to the aforementioned aspects of the invention, the target state of charge is increased if the decreased voltage value is equal to or lower than the threshold. Thus, it is made possible to set the target state of charge lower than that used in the related art, in which the target state of charge is fixed, and it is therefore made possible to extend the lifetime of the electricity storage device.

BRIEF DESCRIPTION OF THE DRAWINGS

The foregoing and further objects, features and advantages of the invention will become apparent from the following description of an embodiment with reference to the accompanying drawings, wherein like numerals are used to represent like elements and wherein.

DETAILED DESCRIPTION OF THE EMBODIMENT

Figure 1:
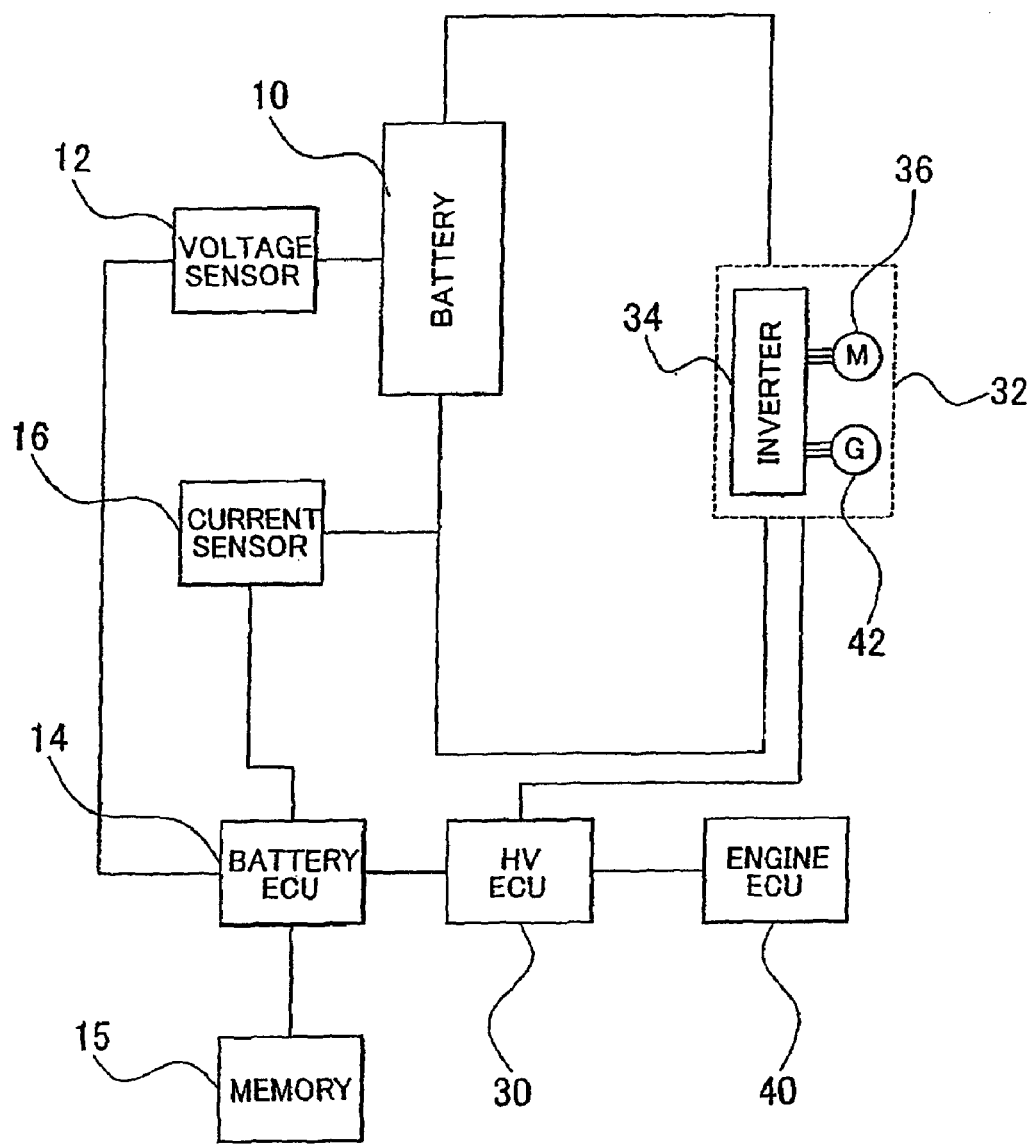
FIG. 1 is a block diagram showing an overall configuration of a battery control apparatus.

An example embodiment of the invention will be described below with reference to the attached drawings. FIG. 1 is a block diagram showing an overall configuration of a battery control apparatus (electrical power storage control apparatus) according to an embodiment of the invention. A battery 10 (electrical power storage device) is a lithium ion battery that is mounted on a hybrid vehicle as a main battery, and is constructed by connecting a plurality of battery cells in series. Note that, other types of batteries, such as a nickel metal hydride (NiMH) battery, may be employed as the battery 10.

A battery ECU 14 controls the battery 10 so that a state of charge is maintained near a target state of charge. The battery ECU 14 changes the target state of charge of the battery 10, and a method of change will be described later in detail. A voltage sensor 12 measures a voltage of each of the battery cells constituting the battery 10, and the measurement result obtained by the voltage sensor 12 is output to the battery ECU 14. A current sensor 16 measures charge/discharge current to/from the battery 10, and the measurement result is output to the battery ECU 14. The battery ECU 14 integrates the charge/discharge current to/from the battery cells so as to estimate the state of charge of the battery 10. A memory 15 stores, for example, a time $T_1$ necessary for calculating the amount of decrease in voltage at a maximum battery power output (reference power output), which will be described later in the specification.

The battery ECU 14 is provided with an internal timer (not shown). The battery ECU 14 outputs the obtained state of charge to an HV ECU 30, and the HV ECU 30 controls operation of a load 32 based on the state of charge input from the battery ECU 14 to the HV ECU 30. The load 32 includes a drive motor 36, a generator 42, and an inverter 34, and the electric power output from the battery 10 is supplied to the drive motor 36 through the inverter 34.

The HV ECU 30 determines a torque output from the drive motor 36 based on, for example, an accelerator pedal operation amount, and controls the drive motor 36 by controlling the inverter 34 so that the determined torque is output. Further, the HV ECU 30 makes a request to an engine ECU 40 for outputting power so as to control a driving force to operate the generator 42 and a driving force to operate wheels output from an engine.

Figure 2:
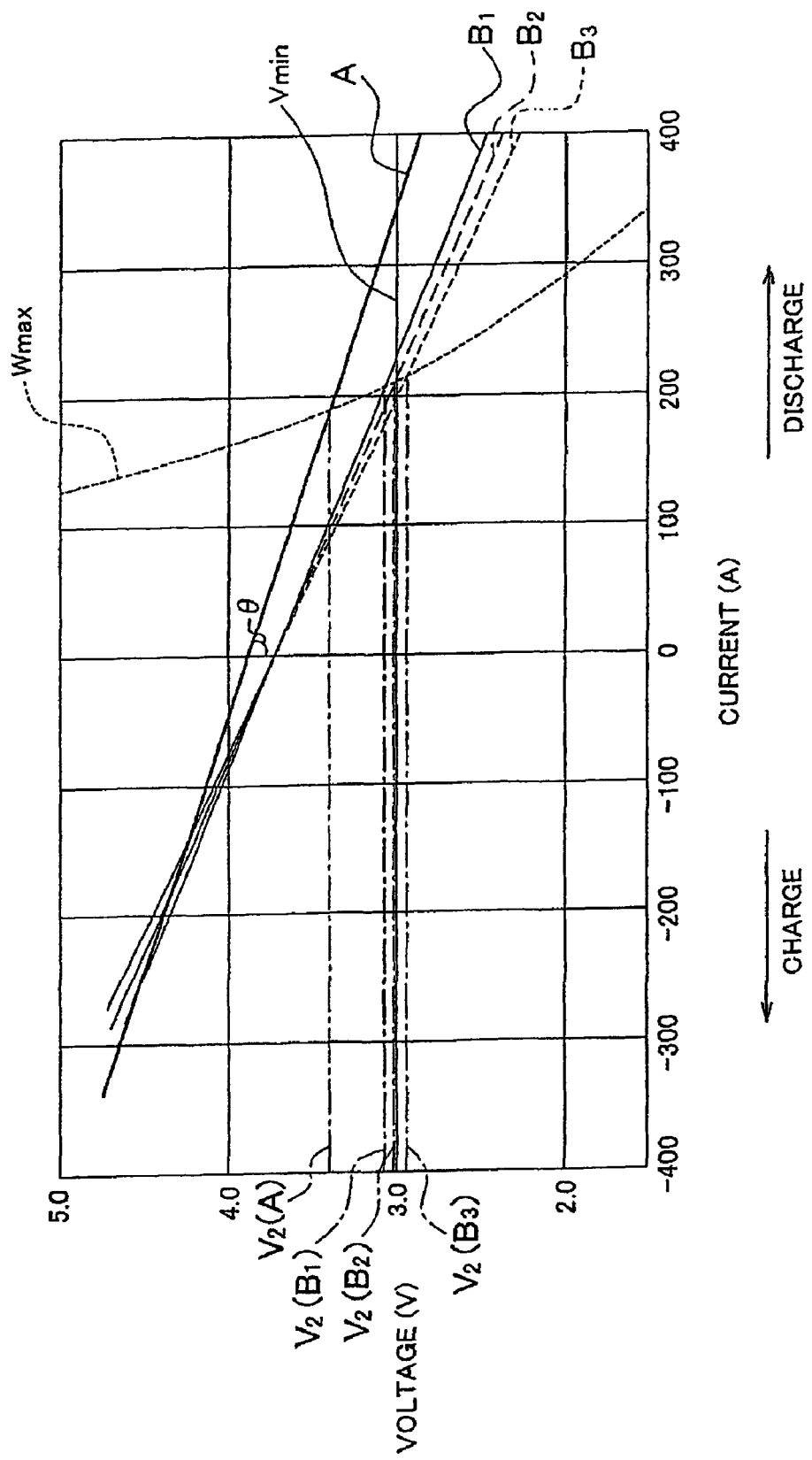
FIG. 2 is a graph illustrating a relation between a current-voltage relation (hereinafter referred to as the "I-V characteristic") of the battery 10 and battery power output.

Next, referring to FIG. 2, it is described why the target state of charge of the battery 10 is changed. FIG. 2 is a graph illustrating a relation between a current/voltage relation (hereinafter referred to as "I-V characteristic") of the battery 10 and the battery power output. The horizontal axis in the graph indicates the current values, and the vertical axis indicates the voltage values. The graph shows the I-V characteristics with respect to the current values and voltage values per battery cell.

In the graph, the line A shows the I-V characteristic of the battery 10 when the state of charge is set to 60%, and each line B shows the I-V characteristic of the battery 10 when the state of charge is set to 40%. The isopower curve Wmax shows the maximum battery power output (reference power output) of the battery 10 that corresponds to a maximum vehicle power output. In other words, the isopower curve Wmax (hereinafter called the maximum battery power curve Wmax) shows the power output from the battery 10 required to obtain the maximum vehicle power output. Note that, the maximum vehicle power output used in the embodiment is a design value that is previously set in accordance with, for example, the type and weight of the vehicle. Further, a value Vmin is the minimum voltage value (threshold) of the battery 10, and is set to 3V in the embodiment. Note that, the minimum voltage value Vmin is a design value that is previously set in accordance with, for example, the type and weight of the vehicle. When the voltage value of the battery 10 becomes equal to or lower than the minimum voltage value Vmin thus set, a vibration, which is similar to so-called knocking, may occur in the vehicle. Therefore, the voltage value of the battery 10 should be set higher than the minimum voltage value Vmin.

As mentioned above, if the target state of charge is set high, the rate at which the battery 10 degrades becomes faster. Accordingly, in order to achieve a longer lifetime of the battery 10, the target state of charge needs to be set low.

If the target state of charge of the battery 10 is fixed at 40%, which is lower than that of the conventional case (60% in the conventional case), the battery 10 gradually degrades as the battery 10 repeats charging and discharging, and thus, the internal resistance increases. As a result, the inclination of the I-V characteristic line in the graph is changed from $B_1$ to $B_2$, then from $B_2$ to $B_3$, as time passes. Because the target state of charge is determined based on the voltage value when the electric current flowing through the battery 10 is 0 (A), the voltage values corresponding to 0 (A) on the I-V characteristic lines $B_1$, $B_2$, and $B_3$ are the same.

Accordingly, a voltage value $V_2$ (reference voltage value) at the intersection of the I-V characteristic line $B_3$ and the maximum battery power output curve Wmax is equal to or smaller than the minimum voltage value Vmin. In the graph, when the target state of charge is in the range of 40% to 80%, there is a tendency with respect to the I-V characteristic that an angle θ, which is formed between the I-V characteristic line and the line on which electric current is 0 (A), becomes larger, and the voltage value corresponding to a current of 0 (A) becomes larger, as the target state of charge increases. The I-V characteristics shown by the lines A and B are one example. The voltage value corresponding to a current of 0 (A) on the I-V characteristic line A is higher than the voltage value corresponding to a current of 0 (A) on the I-V characteristic line B, and the above-mentioned angle θ of the I-V characteristic line A is larger than that of the I-V characteristic line B. Accordingly, increasing the target state of charge is effective for increasing the reference voltage value $V_2$, which has decreased to the value equal to or below the minimum voltage value Vmin, to a value higher than the minimum voltage value Vmin. It should be noted that the reference voltage value of the electricity storage device is a voltage value corresponding to the intersection of the maximum battery power output curve Wmax and the I-V characteristic line, and varies with time.

As shown in FIG. 2, when the I-V characteristic is as shown by the line A, that is, the target state of charge is set to 60%, there is a margin between the reference voltage value $V_2$ corresponding to the maximum battery power output Wmax and the minimum voltage valve Vmin. Therefore, the target state of charge can be decreased. Further, as previously described in connection with the related art, the rate at which the battery 10 degrades can be made slower by decreasing the target state of charge. Accordingly, it is possible to achieve a longer lifetime of the battery 10 by decreasing the target state of charge. In addition, it is possible to reduce the size of the battery 10, and hence, the size of the hybrid vehicle.

This is the reason for changing the target state of charge. A specific method to change the target state of charge will be described below.

Figure 3A:
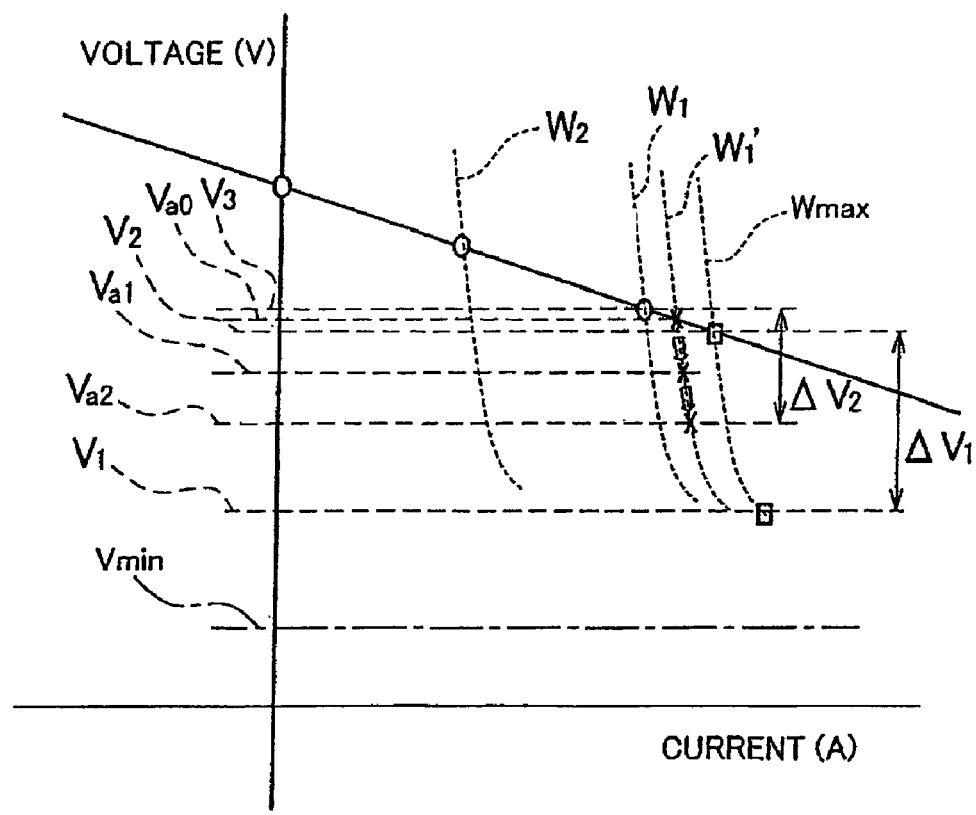
FIG. 3A shows a partial illustration of an I-V characteristic shown in FIG. 2.
Figure 3B:
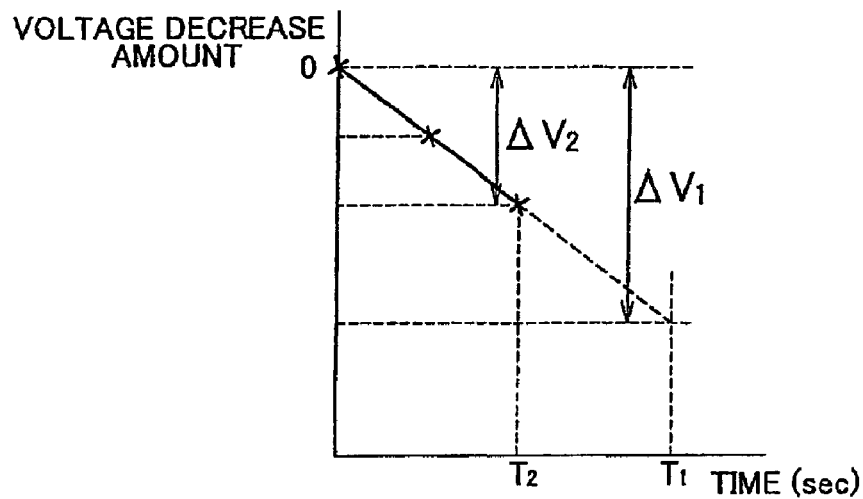
FIG. 3B is a T-$\Delta$V diagram illustrating a relation between time and the amount of decrease in voltage.

FIG. 3A shows a partial illustration of an I-V characteristic shown in FIG. 2. FIG. 3B is a T-ΔV diagram illustrating how the voltage value of the battery 10 decreases as time passes. In the foregoing paragraph, it is described that the target state of charge is changed in accordance with the result of comparison between the reference voltage value $V_2$, which corresponds to the maximum battery power output Wmax, and the minimum voltage value Vmin to determine which is larger than the other. However, in an actual vehicle, the voltage decreases. That is, as shown in FIG. 3A, if, for example, the accelerator pedal of the vehicle is fully depressed, the battery 10 starts discharging, and the power output from the battery 10 is changed from a value $W_2$ to $W_1$, then from $W_1$ to Wmax. Further, when the maximum battery power output Wmax is maintained for a predetermined time $T_1$, the voltage of the battery 10 decreases by the value equal to $\Delta V_1$, and is changed from the reference voltage value $V_2$ to a decreased voltage value $V_1$. For this reason, the target state of charge should be changed so that the decreased voltage value $V_1$ is larger than the minimum voltage value Vmin. Note that, the predetermined time $T_1$ is a design value that is previously set in accordance with, for example, the type and weight of the vehicle.

For the aforementioned reason, the voltage decrease amount $\Delta V_1$ should be actually measured to obtain the decreased voltage value $V_1$ by performing a calculation of $V_2 - \Delta V_1$. However, in an actual vehicle, it is rare that the battery power output reaches the maximum battery power output Wmax, in other words, it is rare that the accelerator pedal is fully depressed, and it is therefore difficult to actually measure the voltage decrease amount $\Delta V_1$. Consequently, it is not possible to effectively change the target state of charge by using the method in which the voltage decrease amount $\Delta V_1$ is actually measured.

In consideration of the foregoing circumstances, in this embodiment, the amount of decrease in voltage from the reference voltage value $V_2$ is estimated based on the voltage decrease amount in the case of the battery power output $W_1$, which is lower than the maximum battery power output Wmax. It should be noted that the battery power output $W_1$ may be regarded as "the power output from the electricity storage device, which is used when calculating the voltage decrease amount of the electricity storage device caused as the vehicle is operated" of the present invention.

For example, when the vehicle is operated and the battery 10 is kept outputting power at the battery power output W1' (W1'>W1) for a period of time $T_2$, the voltage value in the battery 10 decreases from $V_{a0}$ to $V_{a1}$, then from $V_{a1}$ to $V_{a2}$. The battery ECU 14 controls the battery 10 so that the power output from the battery 10 is kept at a certain level even when the voltage decreases. Therefore, the voltage values $V_{a0}$, $V_{a1}$, and $V_{a2}$ are all plotted on the same line indicating the battery power output $W_1'$. In this case, the battery ECU 14 calculates the voltage decrease amount $\Delta V_2$ based on an equation, $V_3 - V_{a2} = \Delta V_2$, and then calculates the voltage decrease amount $\Delta V_1$ based on an equation, $\Delta V_2 \times T_1/T_2 = \Delta V_1$. Based on the calculated value, the decreased voltage value $V_1$ is estimated by performing the calculation of $V_2 - \Delta V_1$.

It is preferable to set the battery power output $W_1$ within a range from 70% to 80% of the maximum battery power output Wmax. If the battery power output $W_1$ is lower than 70% of the maximum battery power output Wmax, the voltage decrease amount in the case of the battery power output $W_1$ is smaller than the voltage decrease amount $\Delta V_1$ in the case of the maximum battery power output Wmax, and therefore the accuracy in estimating the decreased voltage value $V_1$ is reduced. Further, if the battery power output $W_1$ is higher than 80% of the maximum battery power output Wmax, the target state of charge cannot be effectively changed because situations in which a vehicle is driven at the power output higher than 80% of the maximum battery power output Wmax are rare.

If the estimated decreased voltage value $V_1$ is higher than the minimum voltage value Vmin, the target state of charge may be decreased. On the other hand, if the estimated decreased voltage value $V_1$ is equal to or lower than the minimum voltage value Vmin, the target state of charge needs to be increased. When the target state of charge is changed so that the maximum battery power output Wmax is obtained, it is possible to extend the lifetime of the battery 10, and reduce the size of the battery 10.

Figure 4:
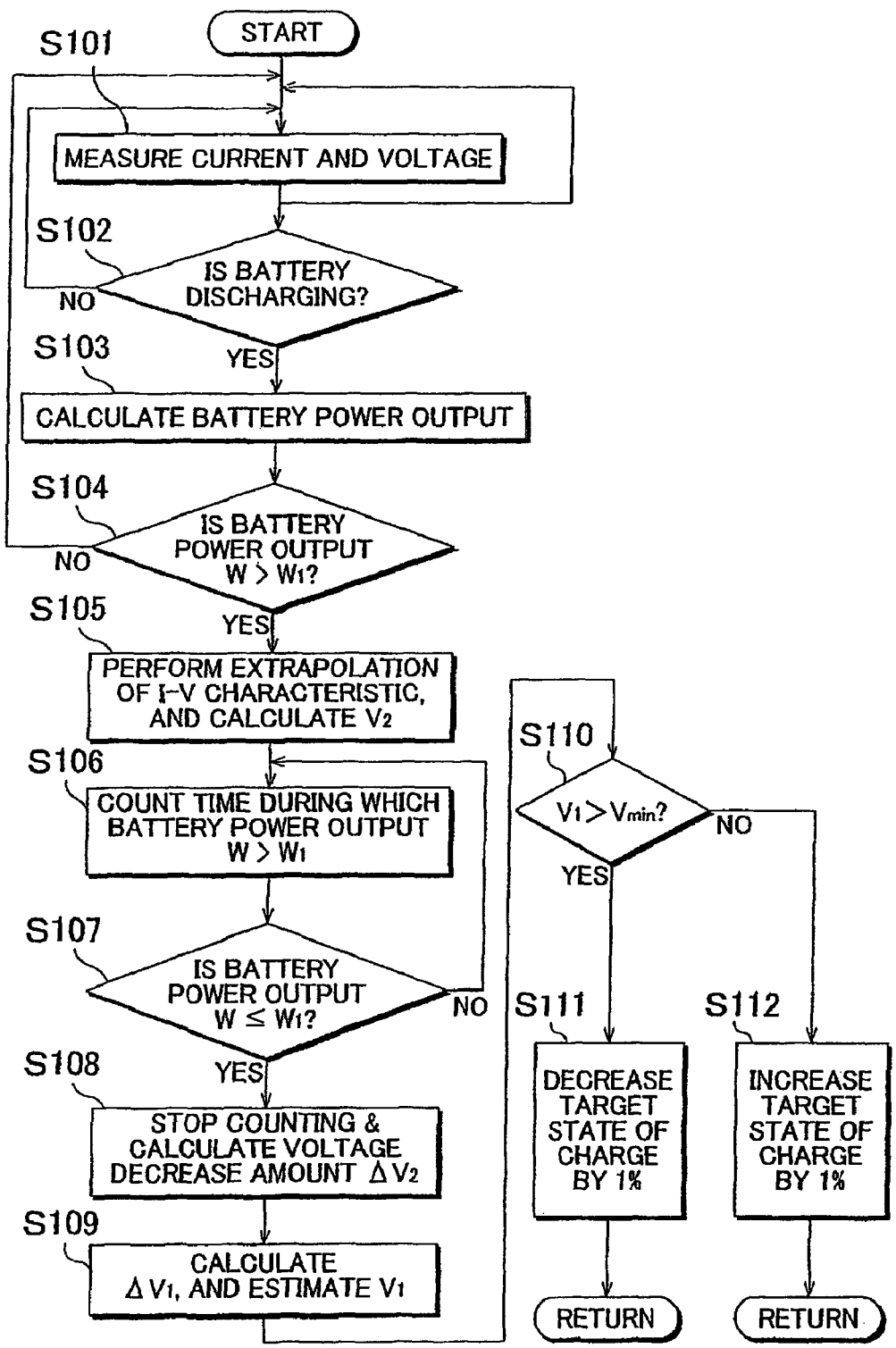
FIG. 4 is a flowchart showing a procedure to change a target state of charge of the battery.
Figure 5A:
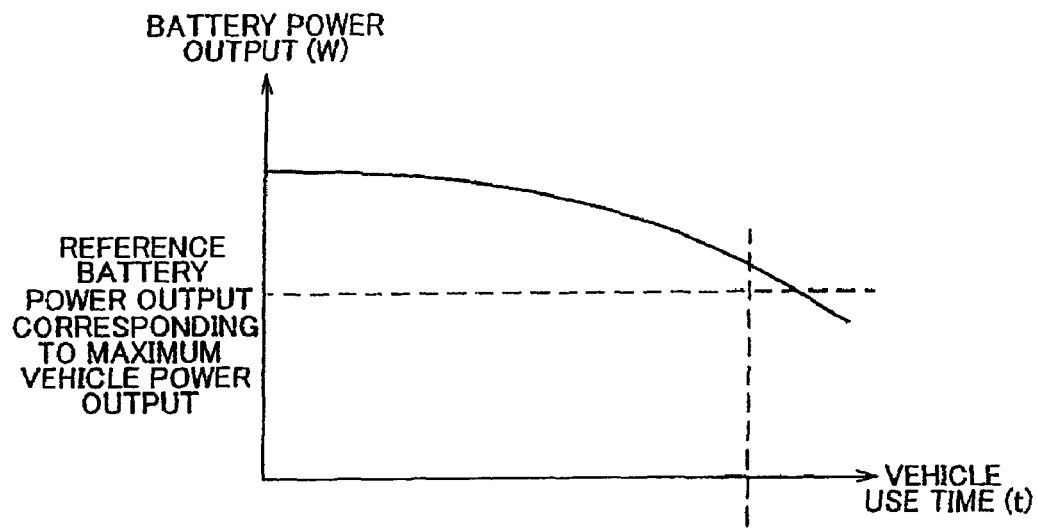
FIGS. 5A and 5B are diagrams showing relations between vehicle use time and the battery power output when the target state of charge of the battery is fixed.
Figure 5B:
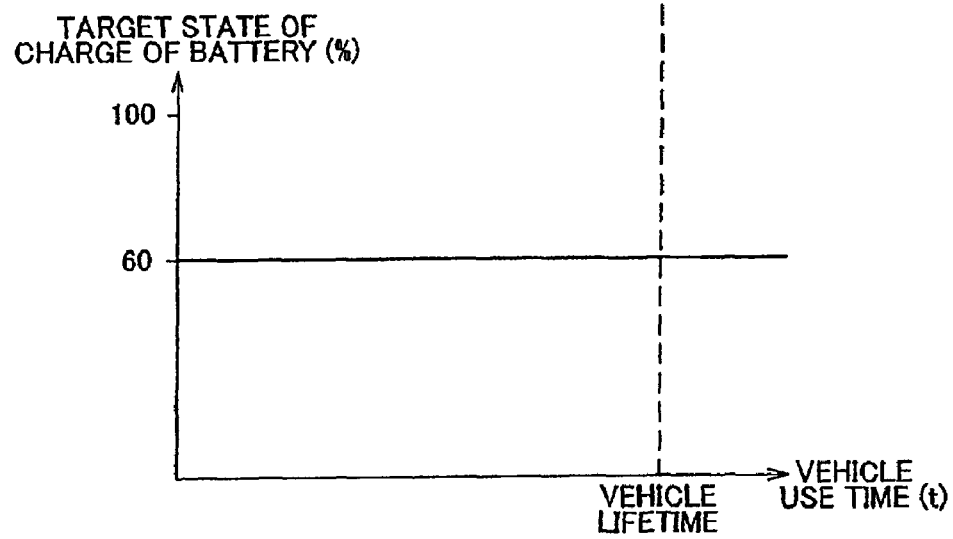
Figure 6:
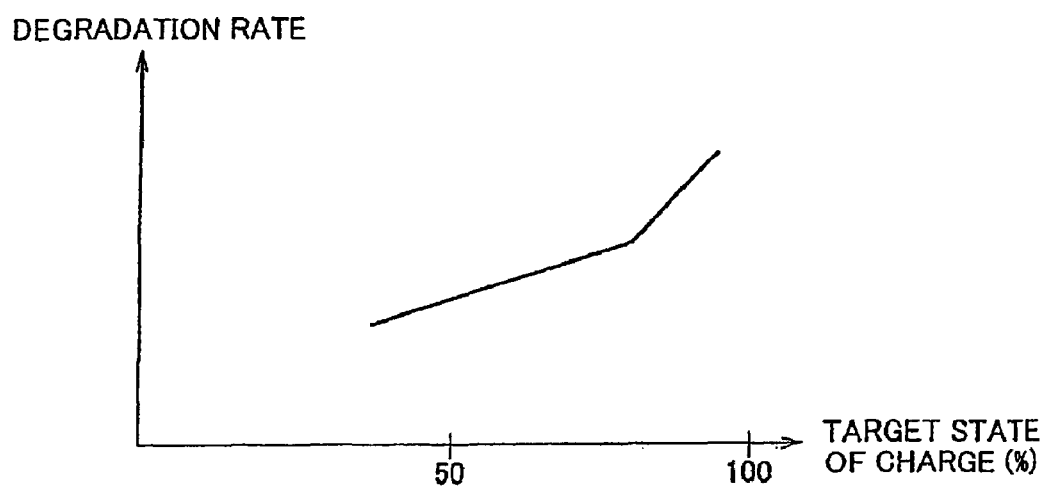
FIG. 6 is a diagram showing a relation between a rate at which the battery degrades and the target state of charge.

Next, the method to change the target state of charge of the battery 10 will be described with reference to a flowchart shown in FIG. 4. The battery ECU 14 changes the target state of charge of the battery 10 in a manner described below. In step S102, the battery ECU 14 determines whether the battery 10 is discharging, based on the voltage value and the current value of the battery 10 output from the voltage sensor 12 and the current sensor 16 in step S101. The voltage value and the current value used in the determination are output from the voltage sensor 12 and the current sensor 16, respectively, every predetermined time. If the voltage value decreases and the current value increases, the battery ECU 14 determines that the battery 10 is discharging. If the battery ECU 14 determines that the battery 10 is discharging in step S102, the battery ECU 14 calculates a battery power output W in step S103.

The battery power output W is calculated as the following product: the voltage value detected by the voltage sensor 12×the current value detected by the current sensor 16×the number of the battery cells constituting the battery 10.

Next, the battery ECU 14 determines whether the battery power output W thus calculated is larger than the battery power output $W_1$ in step S104. If YES, the process proceeds to step S105, and if NO, the process returns to step S101.

In step S105, the battery ECU 14 calculates the I-V characteristic based on the voltage value output from the voltage sensor 12 and the current value output from the current sensor 16, and extrapolation of the calculated I-V characteristic is performed in the diagram of FIG. 2 showing the maximum battery power output curve Wmax. Then, the battery ECU 14 calculates the reference voltage value $V_2$ based on the intersection of the I-V characteristic line and the maximum battery power output curve Wmax, and determines the isopower curve of the battery power output $W_1$ (hereinafter called battery power output curve $W_1$) using, for example, the least squares method based on data sets taken during several seconds to dozens of seconds counted from the time point at which the reference voltage value $V_2$ is calculated. Then, a voltage value $V_3$, which corresponds to the intersection of the I-V characteristic and the battery power output curve $W_1$, is calculated, and the reference voltage value $V_2$ and the voltage value $V_3$ thus calculated are stored in the memory 15. When the battery 10 is discharging, the I-V characteristic is linear, and therefore the I-V characteristic can be graphed if at least two voltage values and two current values are obtained.

In step S104, if the battery power output W exceeds the battery power output $W_1$, the battery ECU 14 immediately actuates the internal timer in step S106. On the other hand, if the battery power output W becomes equal to or lower than the battery power output $W_1$ in step S107, the internal timer is immediately stopped in step S108, and an elapsed time $T_2$ is stored in the memory 15. Further, the decreased voltage amount $\Delta V_2$ is calculated based on the voltage value $V_3$ read out from the memory 15 and the voltage value $V_{a2}$ in the battery 10 output from the voltage sensor 12 after counting operation by the internal timer has been stopped. That is, the decreased voltage amount $\Delta V_2$ is calculated based on an equation, $V_3 - V_{a2} = \Delta V_2$. Then, the calculated decreased voltage amount $\Delta V_2$ is stored in the memory 15 in step S108.

Next, the values $\Delta V_2$, $T_1$, and $T_2$ are read out from the memory 15, and $\Delta V_1$ is calculated based on the equation, $\Delta V_2 \times T_1 / T_2 = \Delta V_1$. At the same time, the reference voltage value $V_2$ is read out from the memory 15. Based on the equation, $V_2 - \Delta V_1 = V_1$, the decreased voltage value $V_1$ is estimated using the aforementioned values in step S109. Then, in step S110, the battery ECU 14 determines whether the decreased voltage value $V_1$ thus estimated is higher than the minimum voltage value Vmin. If YES, the target state of charge is decreased by 1% in step S111. If NO, the target state of charge is increased by 1% in step S112.

It should be noted that the battery 10 is preferably designed so that the maximum target state of charge is equal to or lower than 80%, that is, so that the target state of charge does not reach 80% before the vehicle lifetime expires. In addition, the minimum target state of charge is preferably set to 40%. This is because if the target state of charge is lower than 40%, the decreased voltage value $V_1$ may possibly be equal to or smaller than the minimum voltage value Vmin ($V_1 \leq V_{min}$) when starting to use the battery 10.

The control to change the target state of charge may be continuously performed according to the operational state of the vehicle, or may be performed periodically, such as four times a year. Further, the initial target state of charge may be set to any value as long as the condition that the decreased voltage value $V_1$ is larger than the minimum voltage value Vmin ($V_1 > V_{min}$) is satisfied. For example, the initial target state of charge may be set to the minimum voltage value (40%), and only the control to increase the target state of charge may be performed. On the other hand, the initial target state of charge may be set relatively high (60%), and may be temporarily decreased and then increased.

In the aforementioned embodiment, the maximum battery power output Wmax that corresponds to the maximum vehicle power output is used as the reference value. However, for example, a battery power output corresponding to a vehicle power output that is larger than the maximum vehicle power output may be used as the reference. Further, the minimum voltage value Vmin may be set higher than the minimum voltage value employed in the embodiment, that is, higher than 3V. Further, although the battery is used as the electricity storage device in the embodiment, an electric double-layer capacitor may be used as the electricity storage device.

The invention claimed is:

1. An electricity storage control apparatus that controls an electricity storage device mounted on a vehicle, comprising:
    a control device to change a target state of charge, which is used as the target of a state of charge of the electricity storage device; and
    a calculating device to calculate an amount of decrease in voltage across the electricity storage device caused as the vehicle is operated,
    wherein the control device increases the target state of charge if a decreased voltage value, which is lower than a reference voltage value of the electricity storage device by the voltage decrease amount calculated by the calculating device, is equal to or lower than a threshold,
    wherein the reference voltage value corresponds to a voltage value at the intersection of a maximum electricity storage device power output curve with a current-voltage characteristic line of the electricity storage device at the target state of charge, and
    wherein the threshold is a minimum voltage value for the electricity storage device set based on the vehicle.

2. The electricity storage control apparatus according to claim 1, wherein:
    the control device decreases the target state of charge if the decreased voltage value is larger than the threshold.

3. The electricity storage control apparatus according to claim 1 wherein:
    a reference power output from the electricity storage device generated at the reference voltage value corresponds to a maximum vehicle power output.

4. The electricity storage control apparatus according to claim 3, wherein:
    a power output from the electricity storage device, which is used when calculating the voltage decrease amount of the electricity storage device caused as the vehicle is operated, is smaller than the reference power output.

5. The electricity storage control apparatus according to claim 3, wherein:
    a power output from the electricity storage device, which is used when calculating the voltage decrease amount of the electricity storage device caused as the vehicle is operated, is in a range from 70% to 80% of the reference power output.

6. The electricity storage control apparatus according to claim 1, further comprising:
- a current detecting device to detect a value of electric current flowing through the electricity storage device; and
- a voltage detecting device to detect a value of voltage across the electricity storage device,
- wherein the control device, when the electricity storage device is discharging, calculates a current-voltage characteristic based on the current value detected by the current detecting device and the voltage value detected by the voltage detecting device, and estimates the reference voltage value based on the calculated current-voltage characteristic.

7. The electricity storage control apparatus according to claim 1, wherein:
- the control device changes the target state of charge within a range of 40% to 80%.

8. A method of controlling an electricity storage device that changes a target state of charge, which is used as the target of the electricity storage device mounted on a vehicle, the method comprising:

calculating an amount of decrease in voltage across the electricity storage device caused as the vehicle is operated;

determining whether a decreased voltage value, which is lower than a reference voltage value of the electricity storage device by the voltage decrease amount calculated, is equal to or lower than a threshold; and increasing the target state of charge if it is determined that the decreased voltage value is equal to or lower than the threshold, wherein the reference voltage value corresponds to a voltage value at the intersection of a maximum electricity storage device power output curve with a current-voltage characteristic line of the electricity storage device at the target state of charge, and wherein the threshold is a minimum voltage value for the electricity storage device set based on the vehicle.

* * * * *